E. M. COLE.
DRIVING MECHANISM FOR PLANTERS.
APPLICATION FILED JUNE 8, 1911.
1,029,592.
Patented June 18, 1912.
2 SHEETS—SHEET 1.
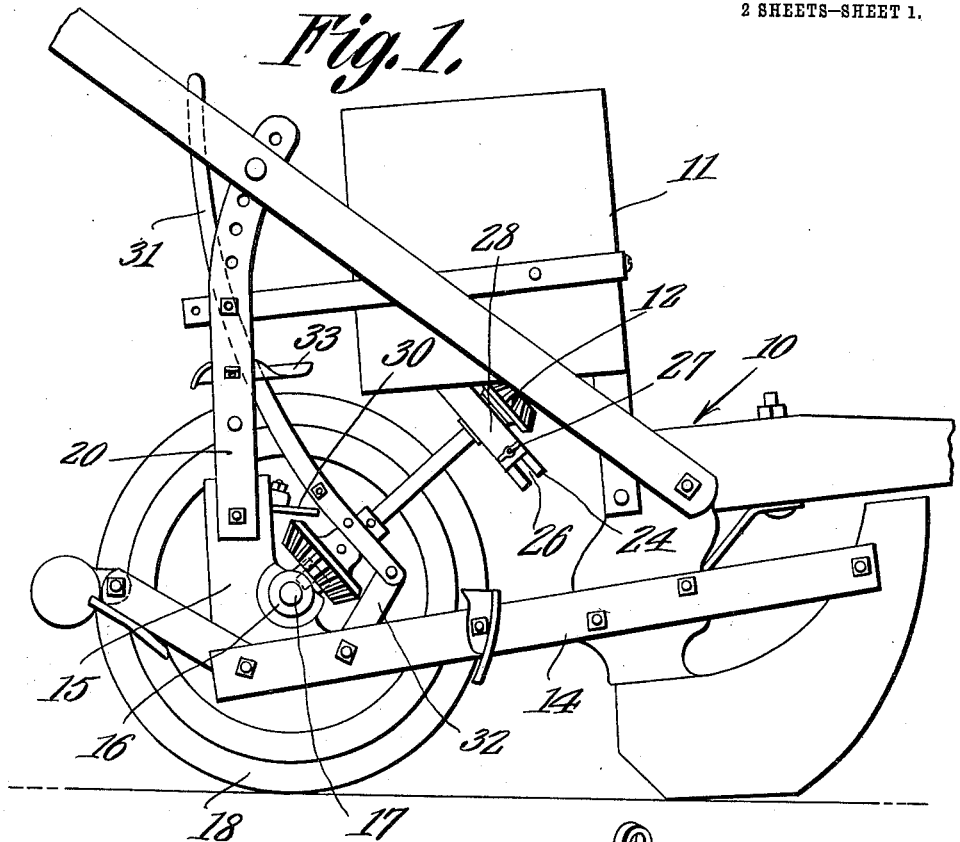
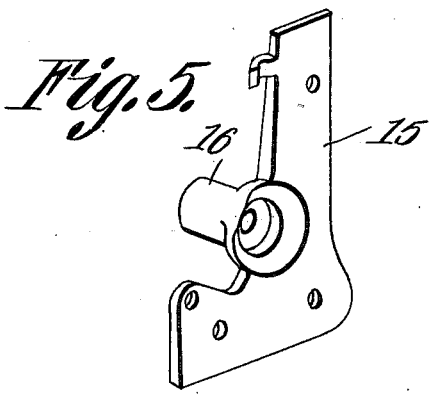
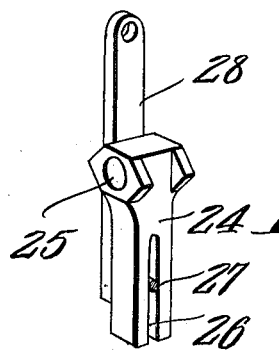
Witnesses
E. M. Cole
Inventor,
by C. A. Snow & Co.
Attorneys.

E. M. COLE.
DRIVING MECHANISM FOR PLANTERS.
APPLICATION FILED JUNE 8, 1911.
1,029,592.
Patented June 18, 1912.
2 SHEETS—SHEET 2.
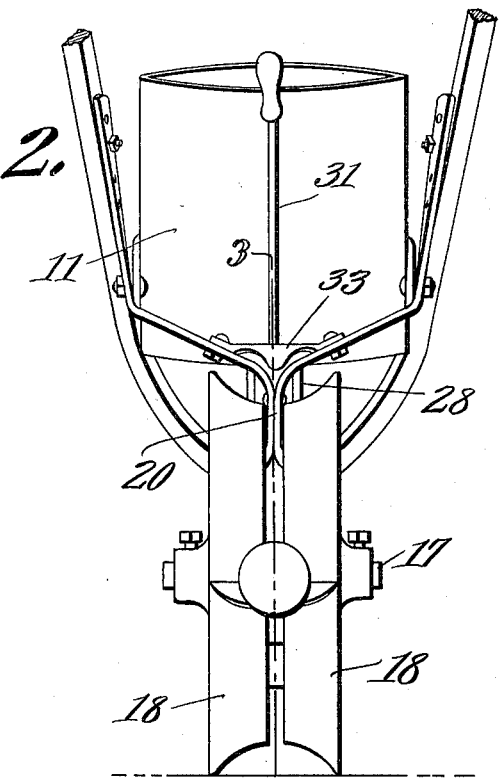
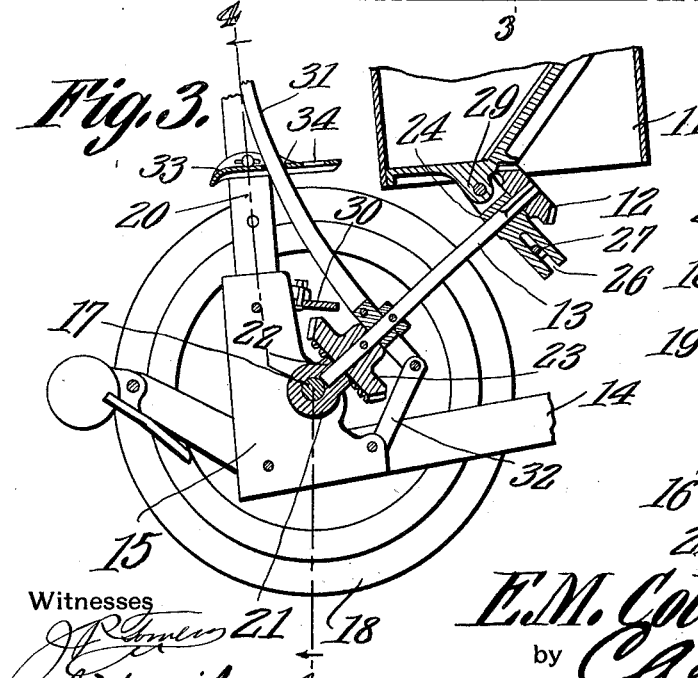
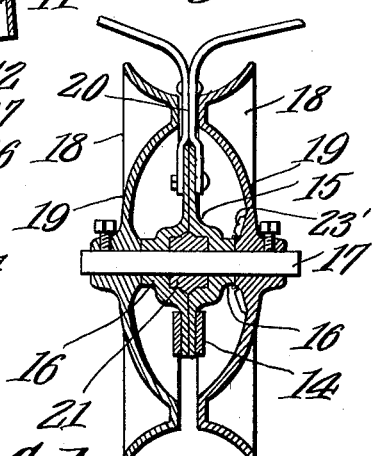

UNITED STATES PATENT OFFICE.

EUGENE MACON COLE, OF CHARLOTTE, NORTH CAROLINA.

DRIVING MECHANISM FOR PLANTERS.

1,029,592.  Specification of Letters Patent.  Patented June 18, 1912.

Application filed June 8, 1911. Serial No. 631,966.

*To all whom it may concern:*

Be it known that I, EUGENE M. COLE, a citizen of the United States, residing at Charlotte, in the county of Mecklenburg and State of North Carolina, have invented a new and useful Driving Mechanism for Planters, of which the following is a specification.

This invention relates to an improvement in driving mechanisms for distributing machines such as planters and fertilizers, the primary object of said invention being to simplify and improve the means for transmitting power from the drive wheels to the distributing mechanism.

A further object of the invention is to so house the driving gears that the same will be out of the path of the material which is distributed, the housing being formed in a simple and economical manner.

In the drawings:—Figure 1 is a side elevation partly in section of a planter equipped with the improved driving mechanism. Fig. 2 is a rear elevation of the same. Fig. 3 is a detail sectional view. Fig. 4 is a transverse section. Fig. 5 is a detail view of one of the brackets which support the main drive shaft, and Fig. 6 is a perspective view of the member which supports a second drive shaft.

In the drawings, 10 designates the frame of the distributing machine and 11 indicates any desired type of distributer, said distributer being driven by means of a gear 12 which is mounted on a shaft 13. The frame is provided with the rearwardly extending beam 14 to which are secured the L-shaped bracket members 15 shown in detail in Fig. 5, these bracket members being formed with the hub extension 16 which together form a bearing for a shaft 17. Mounted on said shaft 17 are a plurality of wheels 18 which together by reason of their concaved peripheries form a cover. The central portions 19 of said wheels are pressed outwardly or the same may be cast with centrally disposed housings, said central portions contacting with the extended end of the hub 16, the wheels however, being secured to and rotating with the shaft 17, said wheels thus completely housing the brackets, the wheels being spaced sufficiently to accommodate the beams 14 on which said brackets are mounted. Secured to the reduced ends of said brackets are the vertically extending arms 20 which intersect the handles of the machine and which are provided with perforations through which extend securing devices which also pass through the handles thus permitting adjustment of the handles. The end portions of these vertically extending arms 20, are brought together and embrace the brackets 15. The hubs 16 of the brackets are hollow and arranged within said hubs and loosely mounted on the shaft 17, is a supporting block 21. This block 21 is provided with a hollow extension 22 which receives the end portion of the shaft 13, a pinion 23 being arranged on said shaft adjacent its supported end, the other end of said shaft on which said pinion 12 is mounted being squared, the shaft being permitted to slide through said pinion in order to throw the gears 23 and 23′ out of mesh. This pinion is arranged within the housing formed by pressing the central portions of the wheels 18 outwardly. Formed interiorly on one of said wheels are a plurality of teeth 23′ which are arranged to mesh with said pinion, thus as the coverer rotates its rotary movement is imparted to the shaft 13 through the medium of the pinion 23, this movement being transmitted to the gear 12 arranged on the other end of said shaft. The end of said shaft adjacent the last mentioned gear is supported by the bearing shown in Fig. 6 which consists of the block 24 which is provided with the aperture 25 through which the shaft 13 extends, said block being also provided with the vertically disposed slot 26 through which extends the pin 27 which is supported by a plurality of arms 28 which are bolted to ears 29 supported by the distributing hopper.

It will be seen by this construction that the driving mechanism is completely housed by the peculiarly constructed covering wheels, a guard plate 30 being disposed immediately above the pinion 23 in order to prevent any dirt which may be carried by the coverer from falling between the wheels onto said pinion. The many advantages of a construction of this character will be clearly apparent as it will be noted that the driving mechanism is so housed as to be protected thus preventing foreign matter from entering between the gears which normally occurs when the driving mechanism is open and unprotected. It will also be noted that while the driving mechanism is housed, the housing is of such construction as will be seen by referring to Fig. 4 that access may be readily had to the driving gear.

In order to throw the driving mechanism into and out of mesh, a curved lever 31 is pivotally supported by the arms 32 which are secured to the brackets 15. The shaft 13 extends through said lever or is secured to the same in any convenient manner, said lever at a point above the coverer contacting with a rack 33 the notches 34 of which hold the lever in its adjusted position. Thus longitudinal movement may be imparted to the shaft 13 until the gear 23 is out of mesh with the gear 23' the square end of said shaft readily passing through the gear 12 to throw the gears 23 and 23' out of mesh. Thus it will be seen that by a movement of the lever 31, the distributing mechanism may be thrown into and out of gear.

What is claimed is:—

1. In a planter, a distributing mechanism, a shaft arranged to impart movement to said distributing mechanism, a second shaft, a plurality of spaced covering wheels mounted on said second shaft, the central portions of said wheels being pressed outwardly to form a housing for the end portion of the first mentioned shaft.

2. In a planter, a distributing mechanism, a shaft arranged to drive said distributing mechanism, a second shaft, a plurality of covering wheels arranged on said second shaft, a plurality of supporting beams secured to the frame of the planter, said beams extending between said wheels, a plurality of spaced brackets supporting the second mentioned shaft, and a plurality of adjustable arms secured to said brackets.

3. In a planter, a distributing mechanism, a shaft arranged to drive said distributing mechanism, a plurality of spaced covering wheels, said shaft extending between said wheels, a pinion arranged on the end portion of said shaft, teeth arranged on the inner face of one of said wheels, said pinion being in mesh with said teeth, a slotted block supporting the other end of said shaft, and means for imparting longitudinal movement to said shaft.

4. In a planter, a distributing mechanism, a shaft arranged to drive said distributing mechanism, a second shaft, a plurality of spaced covering wheels arranged on said second shaft, gears carried by one of said wheels, a pinion arranged on the first mentioned shaft and in mesh with said gear, a slotted block supporting the other end of said shaft, a plurality of depending arms supporting said block, and a pivotally supported lever capable of imparting longitudinal movement to said shaft.

In testimony that I claim the foregoing as my own, I have hereto affixed my signature in the presence of two witnesses.

EUGENE MACON COLE.

Witnesses:
A. M. PITMAN,
W. A. BROOKS.

---

Copies of this patent may be obtained for five cents each, by addressing the "Commissioner of Patents, Washington, D. C."